(12) United States Patent
Ahirwar et al.

(10) Patent No.: US 10,879,578 B2
(45) Date of Patent: Dec. 29, 2020

(54) MM-WAVE WAVEGUIDE WITH AN ELECTRICALLY-INSULATING CORE HAVING AN ELECTRICALLY-CONDUCTIVE TRANSMISSION LINE DISPOSED INSIDE THE CORE

(71) Applicant: Marvell World Trade Ltd., St. Michael (BB)

(72) Inventors: Vijay Ahirwar, Pune (IN); Sai-Wang Tam, Sunnyvale, CA (US); Alden C. Wong, Sunnyvale, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 25 days.

(21) Appl. No.: 16/370,999

(22) Filed: Mar. 31, 2019

(65) Prior Publication Data

US 2019/0312325 A1    Oct. 10, 2019

Related U.S. Application Data

(60) Provisional application No. 62/652,775, filed on Apr. 4, 2018.

(51) Int. Cl.
*H01P 3/16* (2006.01)
*H01P 3/06* (2006.01)
(Continued)

(52) U.S. Cl.
CPC .............. *H01P 3/16* (2013.01); *H01P 3/06* (2013.01); *H04B 3/44* (2013.01); *H04B 3/52* (2013.01); *H01P 3/165* (2013.01); *H04L 67/12* (2013.01)

(58) Field of Classification Search
CPC ........... H01P 3/16; H01P 3/122; H01P 11/006
(Continued)

(56) References Cited

U.S. PATENT DOCUMENTS 2,849,692 A * 8/1958 Fox ................... H01P 1/162
                                             333/240
3,434,774 A    3/1969 Miller
(Continued)

FOREIGN PATENT DOCUMENTS

| EP | 2395598 A1 | 12/2011 |
| EP | 3203287 A1 | 8/2017 |
| WO | 2016209375 A1 | 12/2016 |

OTHER PUBLICATIONS

Bruno et al., "Flexible Dielectric Waveguides with Powder Cores", IEEE Transactions on Microwave Theory and Techniques, vol. 36, No. 5, pp. 882-890, May 1988.
(Continued)

*Primary Examiner* — Benny T Lee

(57) ABSTRACT

A waveguide includes a core and an electrically-conductive transmission line. The core includes an electrically-insulating material that is transmissive at millimeter-wave frequencies. The core is configured to receive a millimeter-wave signal at a first end of the waveguide, and to guide the millimeter-wave signal to a second end of the waveguide. The electrically-conductive transmission line is coupled in propinquity to the core and is configured to conduct an electrical signal between the first end of the waveguide and the second end of the waveguide, in parallel with the millimeter-wave signal guided in the core.

12 Claims, 3 Drawing Sheets

(51) Int. Cl.
*H04B 3/52* (2006.01)
*H04B 3/44* (2006.01)
*H04L 29/08* (2006.01)

(58) Field of Classification Search
USPC ................................................. 333/239, 248
See application file for complete search history.

(56) References Cited

U.S. PATENT DOCUMENTS

| | | | | |
|---|---|---|---|---|
| 3,703,690 | A | * | 11/1972 | Ravenscroft et al. .... H01P 3/16 333/240 |
| 4,463,329 | A | | 7/1984 | Suzuki |
| 4,465,336 | A | | 8/1984 | Huber et al. |
| 2013/0307645 | A1 | | 11/2013 | Mita et al. |
| 2014/0285277 | A1 | | 9/2014 | Herbsommer et al. |
| 2015/0295300 | A1 | | 10/2015 | Herbsommer et al. |
| 2016/0036114 | A1 | | 2/2016 | Okada |
| 2016/0164571 | A1 | * | 6/2016 | Bennett et al. ......... H01P 5/087 375/257 |
| 2016/0240907 | A1 | | 8/2016 | Haroun |
| 2017/0018831 | A1 | | 1/2017 | Henry et al. |
| 2017/0059356 | A1 | | 3/2017 | Kallman et al. |
| 2018/0040936 | A1 | | 2/2018 | Yoshimoto et al. |

OTHER PUBLICATIONS

Rogers Corporation, "RO3000® Series Circuit Materials, RO3003™, RO3006™, R03010™ and RO3035™ High Frequency Laminates", Datasheet, pp. 1-4, year 2018.
IEEE 802.3bw-2015—IEEE Standard for Ethernet Amendment 1: "Physical Layer Specifications and Management Parameters for 100 Mb/s Operation over a Single Balanced Twisted Pair Cable (100BASE-T1)", pp. 1-88, Oct. 2015.
DuPont™ Teflon, Fluoropolymer foam Resin FFR 880, 2 pages, year 2012.
Tam et al., U.S. Appl. No. 16/299,154, filed Mar. 12, 2019.
Tam et al., U.S. Appl. No. 16/258,731, filed Jan. 28, 2019.
International Application PCT/IB2019/052647 Search Report dated Jun. 28, 2019.
Yeh et al., "The Essence of Dielectric Waveguides", Springer, Chapter 5, relevant pp. 155-160, Jun. 17, 2008.
International Application PCT/IB2019/050667 Search Report dated Jun. 6, 2019.
U.S. Appl. No. 16/258,731 office action dated Apr. 2, 2020.
U.S. Appl. No. 16/299,154 office action dated Apr. 2, 2020.

* cited by examiner

MM-WAVE WAVEGUIDE WITH AN ELECTRICALLY-INSULATING CORE HAVING AN ELECTRICALLY-CONDUCTIVE TRANSMISSION LINE DISPOSED INSIDE THE CORE

CROSS-REFERENCE TO RELATED APPLICATIONS

This application claims the benefit of U.S. Provisional Patent Application 62/652,775, filed Apr. 4, 2018. This application is related to U.S. patent application Ser. No. 16/258,731, filed Jan. 28, 2019, entitled "MM-Wave Waveguide Physical Layer Interconnect for Automotive and Industrial Networks," which is assigned to the assignee of the present patent application. The disclosures of these related applications are incorporated herein by reference.

FIELD OF THE DISCLOSURE

The present disclosure relates generally to waveguide interconnects, and particularly to millimeter-wave waveguides.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE 802.3bw-2015—IEEE Standard for Ethernet Amendment 1: Physical Layer Specifications and Management Parameters for 100 Mb/s Operation over a Single Balanced Twisted Pair Cable (100BASE-T1)," March, 2015.

The description above is presented as a general overview of related art in this field and should not be construed as an admission that any of the information it contains constitutes prior art against the present patent application.

SUMMARY OF THE INVENTION

An embodiment that is described herein provides a waveguide including a core and an electrically-conductive transmission line. The core includes an electrically-insulating material that is transmissive at millimeter-wave frequencies. The core is configured to receive a millimeter-wave signal at a first end of the waveguide, and to guide the millimeter-wave signal to a second end of the waveguide. The electrically-conductive transmission line is coupled in proximity to the core and is configured to conduct an electrical signal between the first end of the waveguide and the second end of the waveguide, in parallel with the millimeter-wave signal guided in the core.

In some embodiments, the electrically-conductive transmission line includes a pair of metallic conductor lines disposed along a central axis of the waveguide, inside the core. In an example embodiment, the waveguide further includes an electrically-conductive tube, disposed along the central axis of the waveguide, which is configured to enclose the pair of metallic conductor lines and to separate the pair of metallic conductors from the core.

In some embodiments, the electrically-conductive transmission line extends along a central axis of the waveguide, inside the core, and the waveguide further includes an electrically-insulating layer that is (i) disposed between the core and the transmission line and (ii) configured to reduce an electrical-field component of the millimeter-wave signal at an outer boundary of the transmission line. In an embodiment, the electrically-insulating layer has a lower dielectric constant than the core. In an embodiment, the electrically-insulating layer includes a plastic foam. In an embodiment, the electrically-insulating material in the core includes a fluoropolymer.

In some embodiments, the waveguide further includes an electrically-insulating layer that surrounds the core and is configured to reduce an electrical-field component of the millimeter-wave signal at an outer boundary of the waveguide. In an embodiment, the electrically-insulating layer has a lower dielectric constant than the core. In an embodiment, the electrically-insulating layer includes a plastic foam.

In some embodiments, the electrically-conductive transmission line is configured to conduct the electrical signal at a frequency that is below the frequency of the millimeter-wave signal guided by the core. In an embodiment, the electrically-conductive transmission line is configured to conduct a power-supply signal. In an embodiment, the electrically-conductive transmission line is configured to conduct a baseband signal.

There is additionally provided, in accordance with an embodiment that is described herein, a waveguide including a core, a plastic foam layer surrounding the core, and an outer jacket surrounding the plastic foam layer. The core includes an electrically-insulating material that is transmissive at millimeter-wave frequencies. The core is configured to receive a millimeter-wave signal at a first end of the waveguide, and to guide the millimeter-wave signal to a second end of the waveguide.

There is also provided, in accordance with an embodiment that is described herein, a method for signal transmission in a waveguide. The method includes receiving a millimeter-wave signal at a first end of the waveguide, and guiding the millimeter-wave signal to a second end of the waveguide in a core including an electrically-insulating material that is transmissive at millimeter-wave frequencies. An electrical signal is conducted between the first end of the waveguide and the second end of the waveguide, in parallel with the millimeter-wave signal guided in the core, using an electrically-conductive transmission line that is coupled in proximity to the core.

There is further provided, in accordance with an embodiment that is described herein, an automotive communication network including a transmitter, a receiver and a wired waveguide. The transmitter is configured to generate a millimeter-wave signal. The wired waveguide includes a core and an electrically-conductive transmission line. The core includes an electrically-insulating material that is transmissive at millimeter-wave frequencies, and is configured to receive the millimeter-wave signal from the transmitter at a first end of the waveguide, and to guide the millimeter-wave signal to the receiver at a second end of the waveguide. The electrically-conductive transmission line is coupled in proximity to the core and is configured to conduct an electrical signal between the transmitter and the receiver, in parallel with the millimeter-wave signal guided in the core.

The present disclosure will be more fully understood from the following detailed description of the embodiments thereof, taken together with the drawings in which:

DETAILED DESCRIPTION OF EXAMPLE EMBODIMENTS

Figure 1:
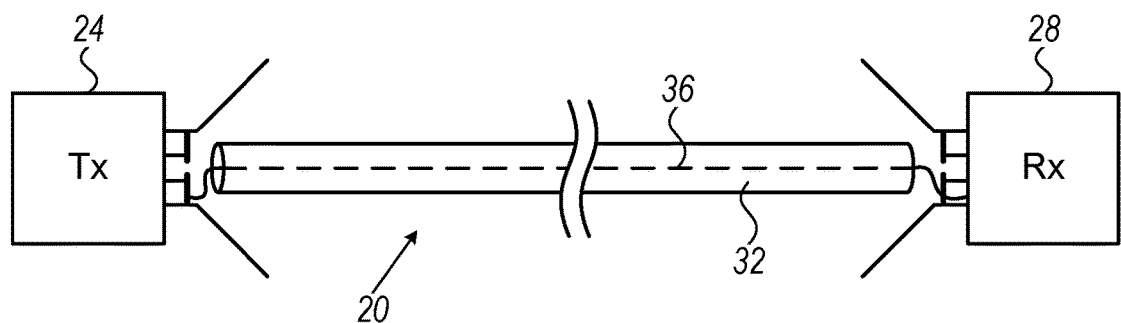
FIG. 1 is a block diagram that schematically illustrates a waveguide-based communication system, in accordance with an embodiment that is described herein.

Embodiments that are described herein provide improved methods and apparatus for waveguide-based communication and networking. The disclosed techniques are useful, for example, in automotive, industrial, smart-home and other environments that are characterized by severe noise, demanding Electro-Magnetic Compatibility (EMC) requirements and limited space, and at the same time require high data rates at high reliability and low cost. The use of mm-wave waveguides in such environments is addressed, for example, in U.S. patent application Ser. No. 16/258,731, filed Jan. 28, 2019, entitled "MM-Wave Waveguide Physical Layer Interconnect for Automotive and Industrial Networks," which is assigned to the assignee of the present patent application and whose disclosure is incorporated herein by reference.

In some embodiments, a networking system comprises at least two communication units that communicate with one another using a millimeter-wave (mm-wave) signal over a waveguide, such as a plastic waveguide, and further exchange an electrical signal over an electrically conductive wire, such as copper. Both the mm-wave signal and the electrical signal are transmitted via a novel wired waveguide, example configurations of which are described in detail herein.

In some embodiments, the electrical signal comprises a communication signal that carries data in addition to the data carried by the mm-wave signal, in other embodiments the wiring is used to power devices that are coupled to the waveguide, while still in other embodiments the wiring is configured both to power connected devices as well as carry data in addition to data carried by the mm-wave signal.

In some of these embodiments, the mm-wave signal and the electrical signal carry data in the same direction (i.e., one communication unit serves as the transmitter for both signals, and the other communication unit serves as the receiver for both signals). Alternatively, the mm-wave signal and the electrical signal carry data in opposite directions (i.e., one communication unit serves as the transmitter for the mm-wave signal and as the receiver for the electrical signal, while the other communication unit serves as the receiver for the mm-wave signal and as the transmitter for the electrical signal).

In the context of the present disclosure and in the claims, the term "millimeter-wave signal" refers to a signal whose wavelength is roughly in the range of 1 mm-10 mm. The electrical signal typically is lower in frequency than the mm-wave signal. In a non-limiting example, the mm-wave signal has a frequency of 60 GHz or higher, and the electrical signal has a frequency of 25 GHz or lower. The disclosed techniques are, however, suitably adaptable for application in other spectral bands. In one example embodiment the waveguide carries an Ethernet compliant signal while an electrical signal is a baseband signal.

In alternative embodiments, the electrical signal comprises a power-supply signal that provides electrical power from one communication unit to the other. Such a power supply signal may comprise a Direct Current (DC) or Alternating Current (AC) signal. A data signal may be embedded in the power-supply signal using techniques such as those used for powerline communication systems.

In some disclosed embodiments, the waveguide connecting the communication units comprises a core comprising an electrically-insulating material that is transmissive at millimeter-wave frequencies for guiding the mm-wave signal, and an electrically-conductive transmission line for conducting the electrical signal. Several example waveguide configurations are described herein.

In the disclosed configurations, the core and the transmission line are coupled in proximity to one another, but nevertheless have minimal adverse effects on each another's performance. For example, in some embodiments the transmission line runs through the central axis of the core, and is surrounded by a plastic foam layer, or other suitable insulating layer. The plastic foam layer reduces the electrical-field component of the millimeter-wave signal at the boundary of the electrically-conductive transmission line, thereby reducing interference between the mm-wave signal and the electrical signal.

In other embodiments that are described herein, a waveguide comprising an electrically-insulating material that is transmissive at millimeter-wave frequencies, for guiding a mm-wave signal. The waveguide further comprises a plastic foam layer surrounding the core. The plastic foam layer is surrounded by an outer jacket. The plastic foam layer is helpful in reducing leakage of mm-wave energy from the core, e.g., when the outer jacket is touched or is otherwise placed adjacently to external objects.

In addition to the performance benefits noted above, the waveguide configurations described herein simplify the interconnection of communication units, because both mm-wave and electrical signals are routed via the same waveguide and coupled to the communication units using the same connectors. An example connector, which comprises terminals for both the electrically-insulating core and the electrically-conducting transmission line, is also described.

FIG. 1 is a block diagram that schematically illustrates a waveguide-based communication system, in accordance with an embodiment that is described herein. In an example embodiment, the system of FIG. 1 is used in an automotive communication network, for in-car networking in a vehicle. In another embodiment, the system of FIG. 1 is used for data communication in an industrial plant. Alternatively, the disclosed techniques are applicable in any other suitable application or environment.

In some embodiments, a waveguide 20 is used as a communication medium between two communication units, e.g., a transmitter (TX) 24 and a receiver (RX) 28. Waveguide 20 comprises a core 32 comprising an electrically-insulating material that is transmissive at millimeter-wave frequencies. Core 32 is configured to receive a millimeter-wave signal from TX 24, and to guide the millimeter-wave signal to RX 28. Waveguide 20 further comprises an electrically-conductive transmission line 36. Transmission line 36 is coupled in proximity to core 32 and is configured to conduct an electrical signal from TX 24 to RX 28, in parallel with the millimeter-wave signal guided in the core.

In an embodiment, TX 24 comprises suitable coupling circuitry for coupling the mm-wave signal and the electrical signal to waveguide 20. Receiver 28 comprises similar coupling circuitry for extracting the mm-wave signal and the electrical signal from waveguide 20. Any suitable type of coupling circuitry, e.g., antenna and/or connector, can be used in TX 24 and RX 28.

In an example embodiment, TX 24 generates data for transmission, and transmits some of the data using the mm-wave signals and some of the data using the electrical signal. In this manner, the achievable communication bandwidth from TX 24 to RX 28 is increased, e.g., doubled.

In an alternative embodiment, TX 24 transmits data to RX 28 using the mm-wave signal. Additionally, RX 28 transmits data to TX 24 using the electrical signal. In this manner, bidirectional communication is supported. The data transmitted from RX 28 back to TX 24 may comprise, for example, acknowledgements, feedback information, user data, or any other suitable information.

In yet another embodiment, TX 24 supplies electrical power for powering RX 28 using the electrical signal. Alternatively, RX 28 uses the electrical signal for supplying electrical power to TX 24. In this manner, power supply circuitry need not be duplicated in every communication unit. In still other embodiments, the electrical signal conducted by the transmission line is used both for data transfer and for supplying power.

Figure 2A:
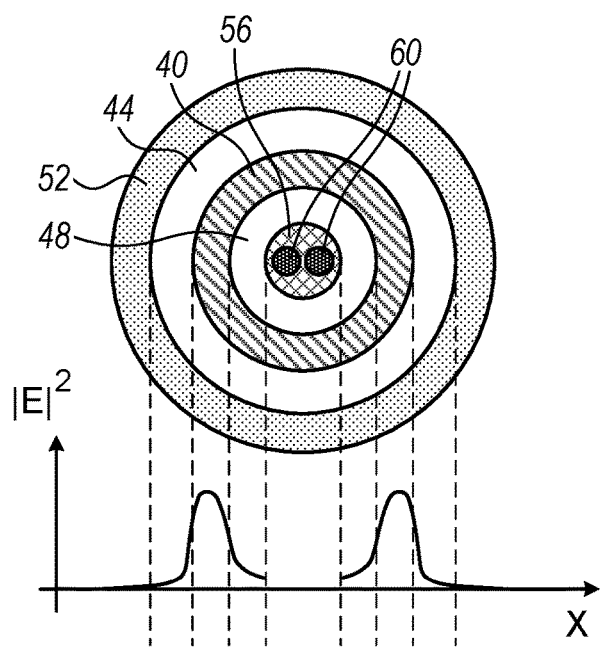
FIGS. 2A and 2B are diagrams that schematically illustrate transversal cross-sections of waveguides, in accordance with an embodiment that is described herein.

FIG. 2A is a diagram that schematically illustrates a transversal cross-section of a waveguide, in accordance with an embodiment that is described herein. In this embodiment, the electrically-insulating core comprises three layers—A solid plastic layer 40 that is placed between an inner plastic foam layer 48 and an outer plastic foam layer 44. A plastic jacket layer 52 surrounds the core.

The electrically-conducting transmission line in this embodiment comprises a twisted pair of electrical conductor lines 60. Twisted pair 60 is enclosed in a hollow metallic tube 56 that runs along the central longitudinal axis of the waveguide, inside the core. In an embodiment, twisted pair 60 and tube 56 are made of copper. The electrical conductor lines in twisted pair 60 are electrically insulated from one another and from tube 56.

In various embodiments, solid plastic layer 40 may comprise any suitable plastic material. Non-limiting example materials comprise fluoropolymers such as Polytetrafluoroethylene (PTFE), polyethylene (PE), or any other suitable type of material. Plastic foam layers 44 and 48 may each comprise a foam of any suitable plastic material. Non-limiting example materials comprise fluoropolymers such as PTFE, Ethylene tetrafluoroethylene (ETFE), fluorinated ethylene-propylene (FEP), perfluoroalkoxy polymer (PFA), or any other suitable type of material such as PE. The foam of layers 44 and 48 may have any suitable percentage of void, e.g., 50%. Jacket layer 52 typically comprises PE, but may alternatively comprise other suitable materials.

The fluoropolymers listed above may comprise, for example, DuPont™ Teflon® fluoroplastic materials. The chosen fluoropolymer can be foamed using any suitable process. One non-limiting example can be found in "DuPont™ Teflon® Fluoropolymer Foam Resin FFR 880," 2012, which is incorporated herein by reference.

In an example embodiment, the material composition and dimensions of the various elements of the waveguide of FIG. 2A are given in the following table. The total radius of the waveguide in the example below is approximately 5 mm.

TABLE 1

Example waveguide properties

| Waveguide element | Material | Dimensions |
| --- | --- | --- |
| Twisted pair 60 | Copper | N/A |
| Tube 56 | Copper | 1 mm |
| Foam layer 48 | Fluoropolymer foam, 50% void content, Dielectric constant 1.5 | Outer diameter 2 mm |
| Solid layer 40 | PTFE, Dielectric constant 2.1 | Inner radius 2 mm, Outer radius 3 mm |
| Foam layer 44 | Fluoropolymer foam, 50% void content, Dielectric constant 1.5 | Thickness 1 mm |
| Outer jacket 52 | PE | Thickness 1 mm |

Typically, foam layers 44 and 48 have a lower dielectric constant than solid layer 40. The dielectric constant typically decreases with the void percentage of the foam (i.e., higher void percentage means lower dielectric constant). By "sandwiching" solid layer 40 between foam layers 44 and 48 having lower dielectric constant, the vast majority of the energy of the mm-wave signal remains confined in layer 40.

A graph at the bottom of FIG. 2A shows the power (squared magnitude) $|E|^2$ of the electrical-field component of the mm-wave signal, as a function of radius (i.e., distance x from the center of the cross-section). This graph demonstrates the rationale behind the structure of the waveguide and the choice of the various layer properties.

As can be seen in the graph of FIG. 2A, the absolute majority of the energy of the mm-wave signal is confined in solid plastic layer 40. Only a small fraction of mm-wave power extends into the surrounding foam layers 44 and 48. Therefore, only a minimal, negligible amount of mm-wave power reaches the boundary of copper tube 56. Consequently, copper tube 56 (and the electrically-conducting transmission line as a whole) causes only minimal energy loss to the mm-wave signal traversing the core.

At the same time, copper tube 56 sets a defined constraint on the electrical-field component of the mm-wave signal. Tube 56 provides a high degree of shielding that prevents interference between the electrical signal (conducted by twisted pair 60) and the mm-wave signal (guided in the core, primarily in solid layer 40).

Furthermore, because of foam layer 44, only a negligible amount of mm-wave power reaches outer jacket 52. Therefore, the presence of external objects near the waveguide (e.g., touching the waveguide) will have little or no impact of the mm-wave signal.

Figure 2B:
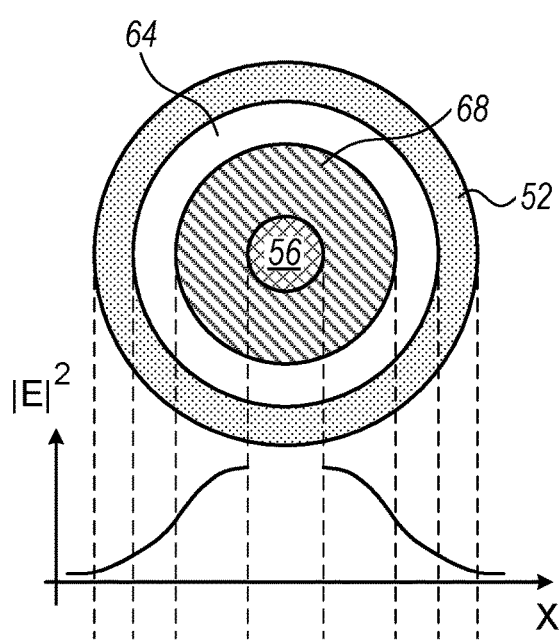

FIG. 2B is a diagram that schematically illustrates, for comparison purposes, a transversal cross-section of a hypothetical waveguide that does not comprise an interposing foam layer between the electrically-conducting transmission line and the solid plastic layer that guides the mm-wave signal. In the configuration of FIG. 2B, the waveguide comprises copper tube 56, which is surrounded by a solid plastic layer 68, which is in turn surrounded by a plastic foam layer 64. A plastic jacket layer 52 surrounds the core. (Twisted pair 60 inside tube 56 is not shown, for the sake of clarity.)

As seen in the graph at the bottom of FIG. 2B, the power of the mm-wave signal $|E|^2$ vs. distance x is confined to solid layer 68. In this configuration, however, the power of the mm-wave signal reaches a maximum at the boundary of copper tube 56, leading to very high energy loss. The comparison between the graphs of FIGS. 2A and 2B demonstrate the performance improvement achieved by foam layer 48 as shown in FIG. 2A.

In an alternative embodiment, solid plastic layer 40 has a dielectric constant that varies as a function of radius over the cross-section thereof. In this embodiment, the dielectric constant of layer 40 is typically largest at the inner diameter, and smallest at the outer diameter, i.e., decreases with distance from the center of the cross-section. Further aspects of mm-wave waveguides having a variable dielectric constant are addressed, for example, in U.S. patent application Ser. No. 16/258,731, filed Jan. 28, 2019, entitled "MM-Wave Waveguide Physical Layer Interconnect for Automotive and Industrial Networks," which is assigned to the assignee of the present patent application and whose disclosure is incorporated herein by reference.

In the embodiments described above, the electrically-conducting transmission line runs along the center of the electrically-insulating core. The disclosed techniques, however, are not limited to this configuration. For example, the description that follows provides an embodiment in which the electrically-conducting transmission line runs along the exterior of the electrically-insulating core.

Figure 3:
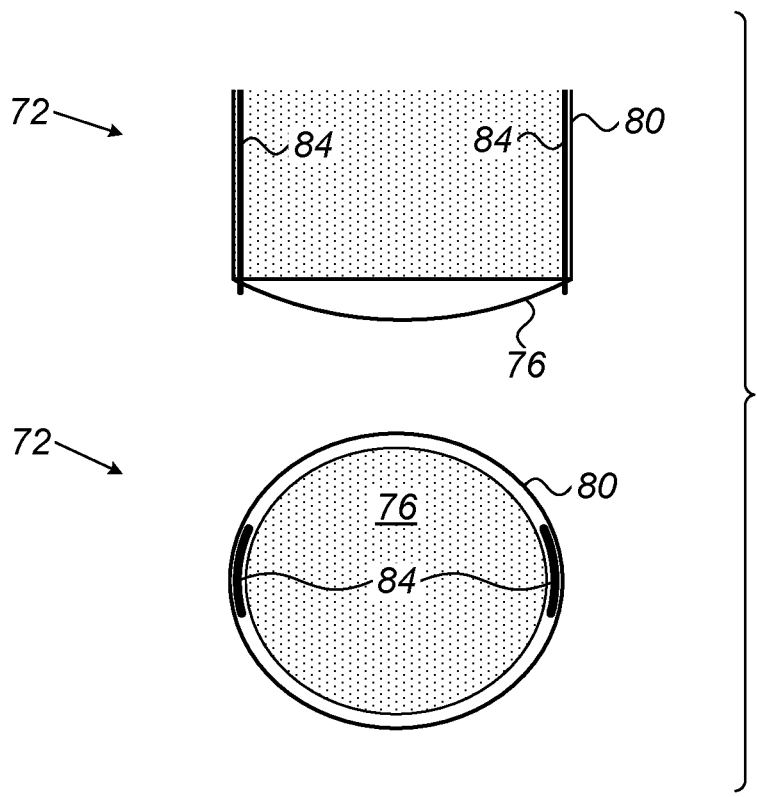
FIG. 3 is a diagram that schematically illustrates longitudinal and transversal cross-sections of a waveguide, in accordance with another embodiment that is described herein.

FIG. 3 is a diagram that schematically illustrates cross-sections of a waveguide 72, in accordance with an embodiment that is described herein. The top of the figure shows a longitudinal cross-section of waveguide 72, whereas the bottom of the figure shows a transversal cross-section of the waveguide.

In this embodiment, waveguide 72 comprises a solid electrically-insulating core 76 that is transmissive at mm-wave frequencies, for guiding the mm-wave signal. Core 76 is typically made of plastic, e.g., PE or a fluoropolymer such as PTFE. An outer jacket 80, typically made of plastic such as PE, surrounds core 76.

In the present example, the electrically-conducting transmission line comprises a pair of metal strips 84, which run along the exterior of core 76. Strips 84 are typically made of copper or other suitable metal, and are placed between core 76 and jacket 80.

Waveguide 72 can be manufactured in various ways. In an example embodiment, plastic core 76 and metal strips 84 are extruded together at the same time in a single extrusion process.

Figure 4:
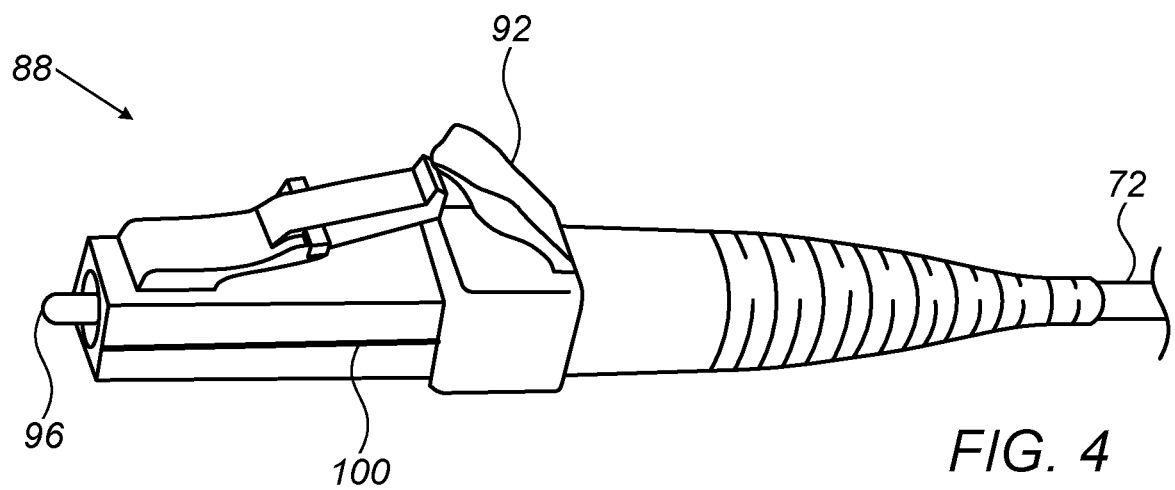
FIG. 4 is a schematic, pictorial illustration of a waveguide connector, in accordance with an embodiment that is described herein.

FIG. 4 is a schematic, pictorial illustration of a waveguide connector 88, in accordance with an embodiment that is described herein. Connector 88 can be used, for example, for connecting waveguide 72 of FIG. 3 to communication units such as TX 24 and RX 28 as shown in FIG. 1. In the present example, connector 88 has a form factor similar to a "Lucent Connector" (LC) optical connector. Generally, however, any other suitable form factor can be used.

In an embodiment, connector 88 comprises a connector body 92. A plastic plug 96 ends core 76, and is used for coupling the mm-wave signal to a mating receptacle on the communication unit. A pair of electrical terminals 100 (one of which is shown in the figure) terminate strips 84, for coupling the electrical signal to the mating receptacle.

In the embodiments described above, foam layer 44 as shown in FIG. 2A was used for reducing the amount of mm-wave power that reaches the exterior surface of the waveguide. This feature is helpful, for example, for avoiding loss of mm-wave energy when the waveguide is touched or otherwise brought in proximity to external objects. In alternative embodiments, this technique is also applicable in waveguide configurations that do not comprise an electrically-conducting transmission line. Examples of such waveguides are given below.

FIGS. 5A-5D are diagrams that schematically illustrate transversal cross-sections of waveguides, in accordance with alternative embodiments that are described herein.

Figure 5A:
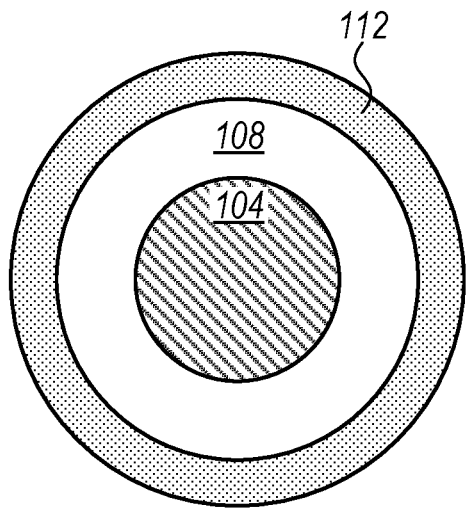
FIGS. 5A-5D are diagrams that schematically illustrate transversal cross-sections of waveguides, in accordance with alternative embodiments that are described herein.

The waveguide of FIG. 5A comprises (i) an electrically-insulating core 104 that is transmissive at millimeter-wave frequencies, for guiding the mm-wave signal, (ii) a plastic foam layer 108 surrounding core 104, and (iii) an outer jacket 112.

Any of the core materials noted above, e.g., PE, PTFE or other fluoropolymer, or any other suitable material, can be used for implementing core 104. Foam layer 108 may comprise a foam of any suitable plastic material. Non-limiting example materials comprise fluoropolymers such as PTFE, ETFE, FEP or PFA, or any other suitable type of material such as PE. The foam of layer 108 may have any suitable percentage of void, e.g., 50%. Jacket 112 typically comprises PE, but may alternatively comprise other suitable materials.

Figure 5B:
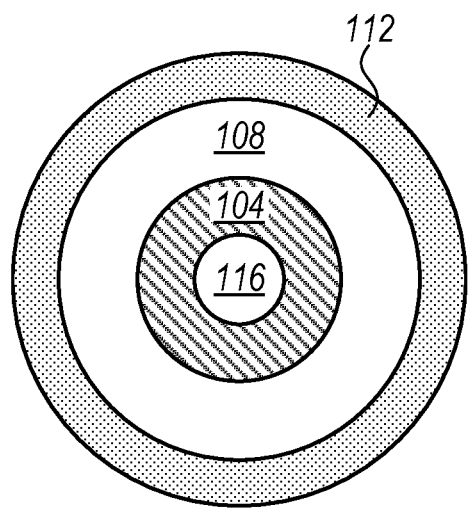
Figure 5C:
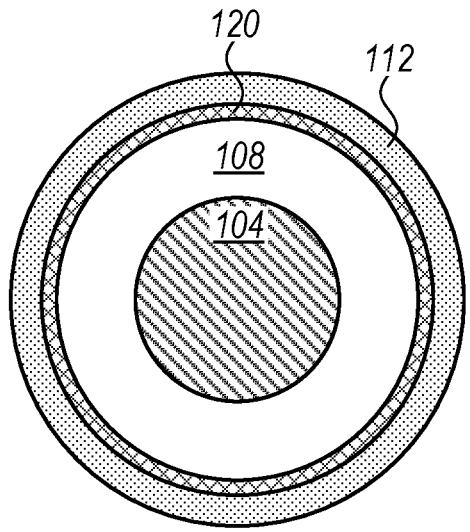
Figure 5D:
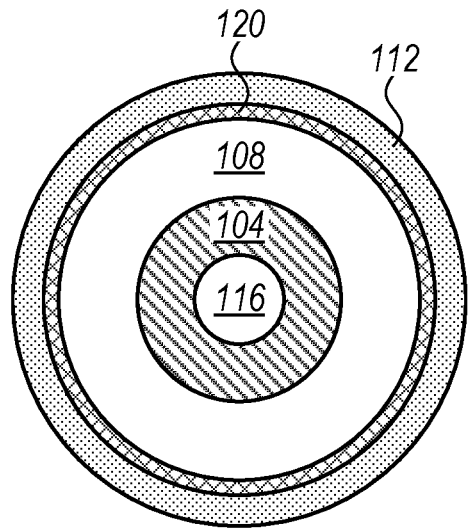

The waveguide of FIG. 5B differs from the waveguide of FIG. 5A in that core 104 has the form of a hollow tube. A hollow lumen 116 runs through the center of core 104. Lumen 116 is filled with a suitable gas, e.g., air or a noble gas. The waveguide of FIG. 5B further comprises a foam layer 108 and an outer jacket 112. The waveguide of FIG. 5C is similar to the waveguide of FIG. 5A, and additionally comprises a thin metallic (e.g., copper or gold) coating layer 120 around foam layer 108. The waveguide of FIG. 5C further comprises a core 104, an outer jacket 112. The waveguide of FIG. 5D comprises both gas-filled lumen 116 and metallic coating layer 120. The waveguide of FIG. 5D further comprises a core 104, a foam layer 108 and an outer jacket 112.

In an example embodiment, the material composition and dimensions of the various elements of the waveguides of FIGS. 5A-5D are given in the following table. The total radius of the waveguide in the example implementation below is approximately 3 mm.

TABLE 2

Example waveguide properties

| Waveguide element | Material | Dimensions |
| --- | --- | --- |
| Lumen 116 | Filled with air or noble gas | Radius 0.5 mm |
| Core 114 | PTFE, Dielectric constant 2.1 | Outer radius 1 mm |
| Foam layer 108 | Fluoropolymer foam, 50% void content, Dielectric constant 1.5 | Thickness ~2-3 mm |
| Metallic coating 120 | Copper or gold | 0.1-0.5 mm |
| Outer jacket 120 | PE | Thickness 1 mm |

It is noted that the various waveguide configurations described above and depicted in the figures are example configurations chosen solely for the sake of conceptual clarity. In alternative embodiments, the disclosed techniques can be implemented using waveguides having any other suitable configurations, e.g., other structures, cross-sections, layer arrangements and orders, dimensions, electrical or mechanical properties, material compositions, and the like.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication network, comprising:
   a transmitter, configured to generate a millimeter-wave signal;
   a receiver; and
   a wired waveguide, comprising:
      a core comprising an electrically-insulating material that is transmissive at millimeter-wave frequencies, the core configured to receive the millimeter-wave signal from the transmitter at a first end of the waveguide, and to guide the millimeter-wave signal to the receiver at a second end of the waveguide;
      an electrically-conductive transmission line, which comprises a pair of metallic conductor lines disposed inside the core along a central axis of the waveguide, the electrically-conductive transmission line configured to conduct an electrical signal between the transmitter and the receiver, in parallel with the millimeter-wave signal guided in the core; and
      an electrically-conductive tube, disposed along the central axis of the waveguide, which is configured to enclose the pair of metallic conductor lines and to separate the pair of metallic conductors from the core.

2. A waveguide, comprising:
   a core comprising an electrically-insulating material that is transmissive at millimeter-wave frequencies, the core configured to receive a millimeter-wave signal at a first end of the waveguide, and to guide the millimeter-wave signal to a second end of the waveguide;
   an electrically-conductive transmission line, which comprises a pair of metallic conductor lines disposed inside the core along a central axis of the waveguide, the electrically-conductive transmission line configured to conduct an electrical signal between the first end of the waveguide and the second end of the waveguide, in parallel with the millimeter-wave signal guided in the core; and
   an electrically-conductive tube, disposed along the central axis of the waveguide, which is configured to enclose the pair of metallic conductor lines and to separate the pair of metallic conductors from the core.

3. The waveguide according to claim 2, wherein the electrically-conductive transmission line is configured to conduct a power-supply signal.

4. The waveguide according to claim 2, further comprising an electrically-insulating layer that is (i) disposed between the core and the transmission line and (ii) configured to reduce an electrical-field component of the millimeter-wave signal at an outer boundary of the transmission line.

5. The waveguide according to claim 4, wherein the electrically-insulating layer has a lower dielectric constant than a dielectric constant of the core.

6. The waveguide according to claim 4, wherein the electrically-insulating layer comprises a plastic foam.

7. The waveguide according to claim 2, wherein the electrically-insulating material in the core comprises a fluoropolymer.

8. The waveguide according to claim 2, further comprising an electrically-insulating layer that surrounds the core and is configured to reduce an electrical-field component of the millimeter-wave signal at an outer boundary of the waveguide.

9. The waveguide according to claim 8, wherein the electrically-insulating layer has a lower dielectric constant than a dielectric constant of the core.

10. The waveguide according to claim 8, wherein the electrically-insulating layer comprises a plastic foam.

11. A waveguide, comprising:
    a core comprising an electrically-insulating material that is transmissive at millimeter-wave frequencies, the core configured to receive a millimeter-wave signal at a first end of the waveguide, and to guide the millimeter-wave signal to a second end of the waveguide; and
    an electrically-conductive transmission line, which is configured to conduct an electrical signal between the first end of the waveguide and the second end of the waveguide, in parallel with the millimeter-wave signal guided in the core, the electrical signal having a frequency that is below a frequency of the millimeter-wave signal guided by the core.

12. A waveguide, comprising:
    a core comprising an electrically-insulating material that is transmissive at millimeter-wave frequencies, the core configured to receive a millimeter-wave signal at a first end of the waveguide, and to guide the millimeter-wave signal to a second end of the waveguide; and
    an electrically-conductive transmission line, which is configured to conduct a baseband signal between the first end of the waveguide and the second end of the waveguide, in parallel with the millimeter-wave signal guided in the core.

* * * * *